United States Patent
Brandt et al.

(10) Patent No.: US 7,049,514 B2
(45) Date of Patent: May 23, 2006

(54) RAIL SYSTEM FOR DISTRIBUTING POWER AND DATA SIGNALS

(75) Inventors: David D. Brandt, Milwaukee, WI (US); Jie Shen, Shanghai (CN); David L. Jensen, Barneveld, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/675,099

(22) Filed: Sep. 30, 2003

(65) Prior Publication Data

US 2005/0067181 A1 Mar. 31, 2005

(51) Int. Cl.
*H02G 3/18* (2006.01)

(52) U.S. Cl. .................. 174/59; 174/50; 174/72 B; 174/88 B; 361/600; 439/620

(58) Field of Classification Search .................. 174/27, 174/59, 50, 17 R, 68.1, 71 B, 72 B, 88 B, 174/99 B, 68.2, 49; 361/600, 601, 602, 641, 361/650, 724; 439/207, 211, 214, 247, 248, 439/924.1, 215, 216, 620, 110, 114, 115, 439/120, 121, 716, 532, 947
See application file for complete search history.

(56) References Cited

U.S. PATENT DOCUMENTS

| | | | | |
|---|---|---|---|---|
| 5,213,518 | A * | 5/1993 | Weidler | 439/211 |
| 5,295,843 | A * | 3/1994 | Davis et al. | 439/924.1 |
| 5,553,412 | A * | 9/1996 | Briechle et al. | 40/124.01 |
| 5,980,324 | A * | 11/1999 | Berg et al. | 439/630 |
| 6,095,867 | A * | 8/2000 | Brandt et al. | 439/620 |
| 6,487,091 | B1 * | 11/2002 | Malkowski et al. | 174/49 |
| 6,490,169 | B1 * | 12/2002 | Watanabe | 174/72 B |
| 6,672,884 | B1 * | 1/2004 | Toh et al. | 439/947 |

\* cited by examiner

*Primary Examiner*—Angel R. Estrada

(74) *Attorney, Agent, or Firm*—Patrick S. Yoder; Alexander M. Gerasimow

(57) ABSTRACT

Transmission of electrical signals can be conducted over a rail. The rail, which may be an at least partially open rail structure, may be disposed within an enclosure, and can be used to transmit data and power signals to an assembly of electrical components. A connector assembly may also be provided to facilitate the transmission of data and power signals between the components and the rail.

28 Claims, 8 Drawing Sheets

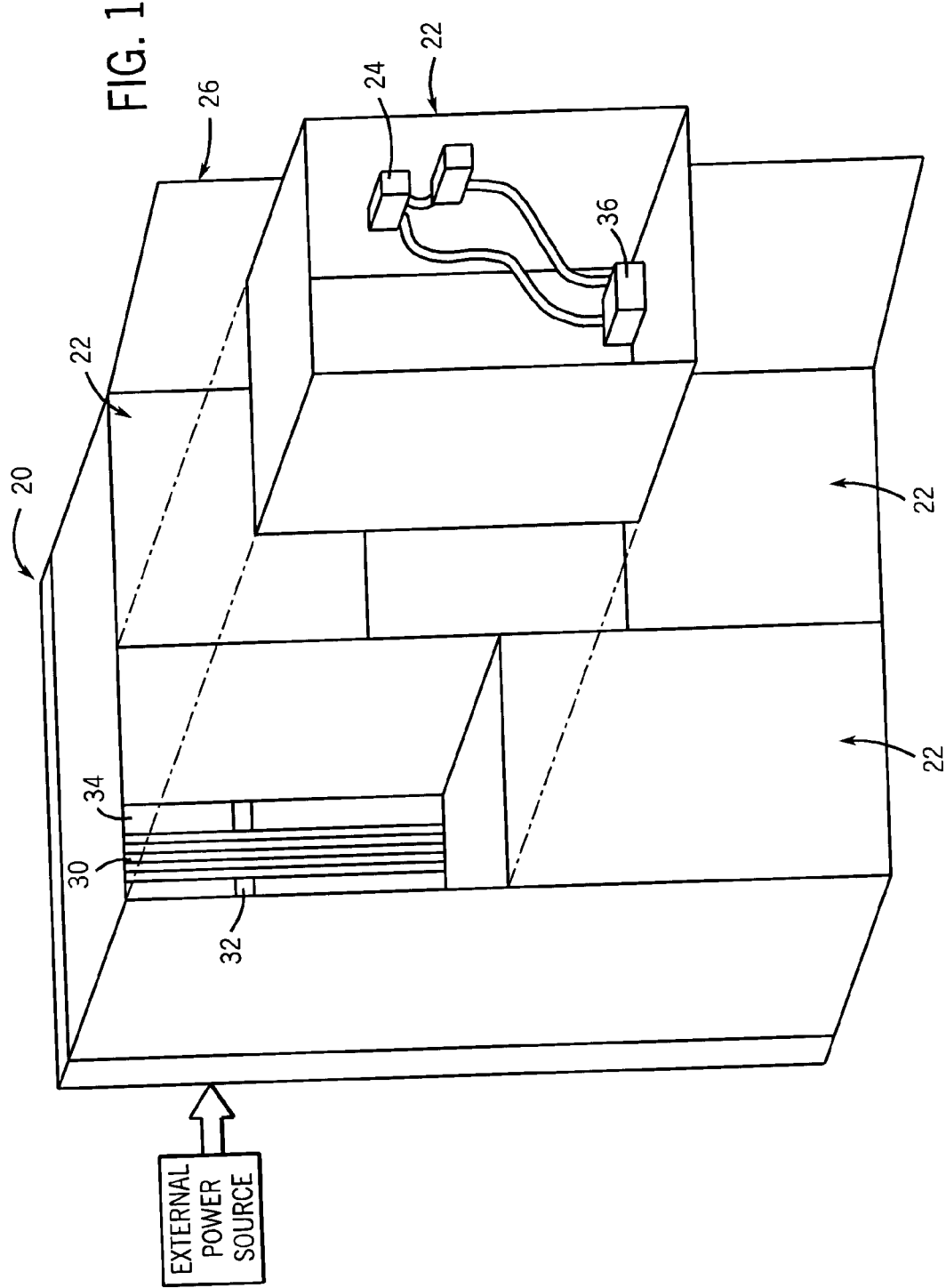

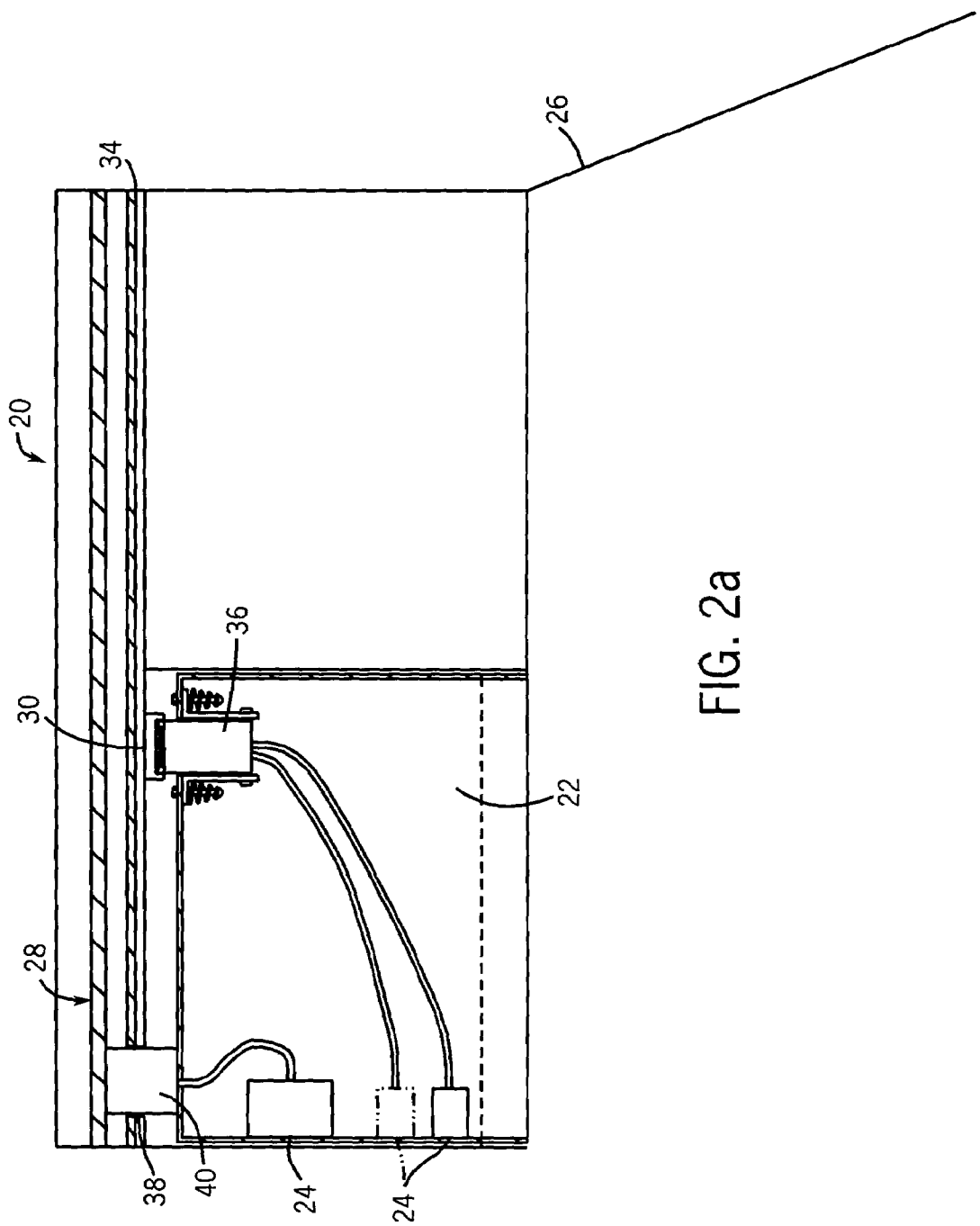

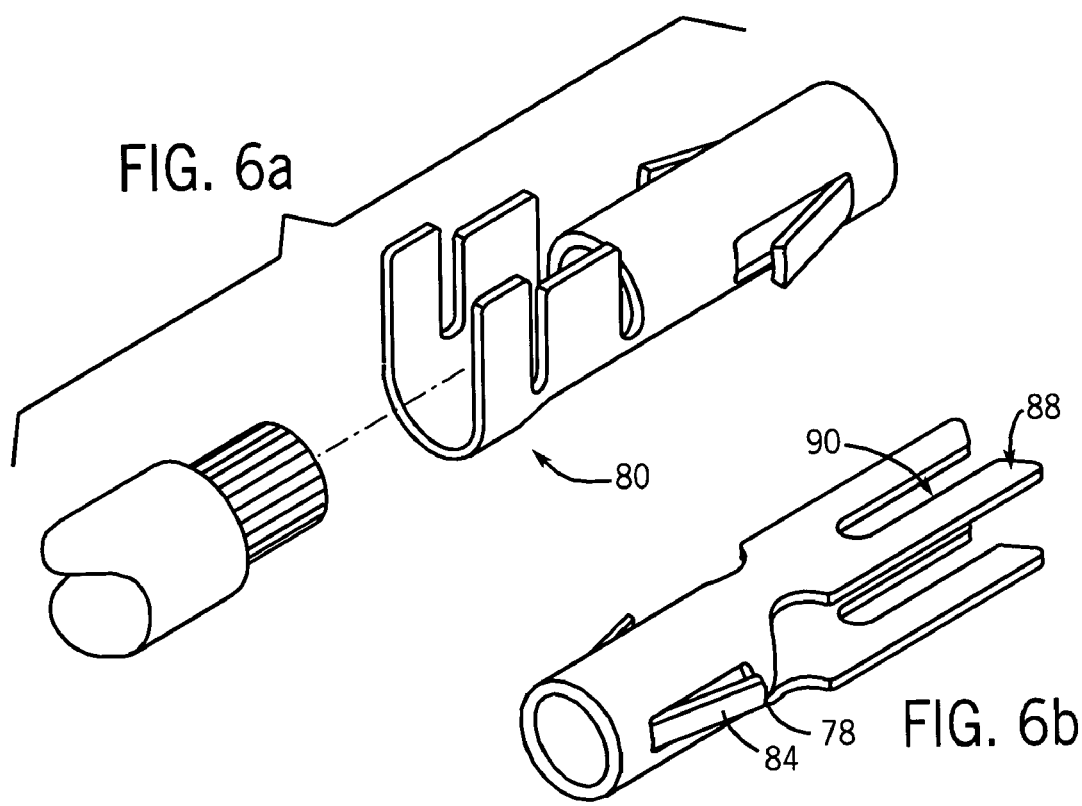
FIG. 6a
FIG. 6b
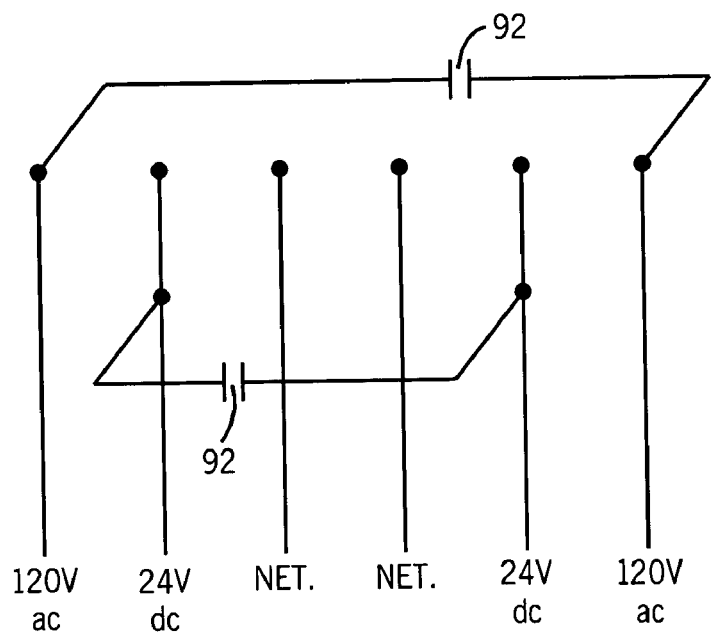
FIG. 7a

RAIL SYSTEM FOR DISTRIBUTING POWER AND DATA SIGNALS

FIELD OF THE INVENTION

The present technique relates to the field of distributing data and power signals. More particularly, the invention relates to a rail system that feeds data and power signals to various components.

BACKGROUND OF THE INVENTION

Distribution systems employed in large commercial and industrial operations can be complex. Motor control centers (MCC), for example, are used in these operations to manage both internal and external power as well as data communication. Within the MCC are disposed a variety of components or devices used in the operation to control various machines or motors. Typically, the MCC is connected to a main power line that feeds 3-phase ac power, such as 208 to 690 Volts ac power, into the MCC. The MCC then manages and distributes this power to various components within the assembly and operation. Exemplary devices contained within the MCC are motor starters, overload relays, or circuit breakers. These devices are then affixed within various units or component assemblies within the MCC. Each unit can be assigned a specific task and contain devices that correspond to that task. For example, each unit may be assigned various remote control and monitoring operations Many of the components of such systems, however, run at different power levels from each other. For example, 3 phase ac power may be fed into the assembly via a main power bus. This main power is then taken from the main power bus, if necessary, and transformed down to more compatible levels. For example, one phase of the main ac power may be used to provide single phase ac power, or may also be converted to other power types, such as to dc power. Alternatively, secondary power may also be provided by a completely separate source. This secondary or tertiary power may then be distributed to the various components within an enclosure or system. Additionally, network data to and from the interconnected assembly may also require distribution. Typically, an interconnected network of cables and wires are employed to facilitate the transmission. Connecting a large number of wires and cables can be a costly and time consuming task. The ability to plugably engage and disengage various power and data supplies to and from the components would reduce the cost of installation and maintenance and improve the efficiency of the component assembly.

Moreover, in existing systems, many of the power and network cables are interconnected in a "daisy chain" manner. Accordingly, disengagement of a component within the assembly may take the remaining components off-line as well. The assembly would be more efficient if certain components could be engaged and disengaged selectively.

There is a need, therefore, for an improved technique for interconnecting components in an electrical assembly. There is, in particular, a present need for a distribution system wherein power and data signals can be easily and quickly supplied via simple, reliable and expandable approach.

SUMMARY OF THE INVENTION

The present technique provides a connection technique designed in response to these needs. The technique may be employed in a wide range of systems, particularly in systems in which a number of electrical components are coupled to power and data conductors. The technique is particularly well suited for transmitting power and data signals within electrical enclosures.

In one embodiment, the power and network data signals are carried over at least partially open rail conductors. These signals, conducted over the rails, are transmitted to various components via a connector assembly. The connector assembly may be slidably mounted to a component support such that the connector assembly remains engaged to the rail assembly even upon partial extraction of the component support.

BRIEF DESCRIPTION OF THE DRAWINGS

The foregoing and other advantages and features of the technique will become apparent upon reading the following detailed description and upon reference to the drawings in which:

FIG. 1 is a perspective view of an exemplary electrical enclosure in which a component assembly is partially removed;

FIG. 2a is a plan view of the enclosure of FIG. 1 in which the top panel is removed and the component assembly is in the engaged position such that the assembly receives main power and secondary power, as well as data signals;

FIG. 6a is an isometric view of an exemplary cable socket assembly;

FIG. 6b is an isometric view of an exemplary rail socket assembly;

FIG. 7a is an electrical schematic of exemplary signals which may be conducted over the rail system, the system having capacitors inserted across the power conducting rails so as to reduce perturbations in the data conducting rails;

DETAILED DESCRIPTION OF SPECIFIC EMBODIMENTS

Figure 2B:
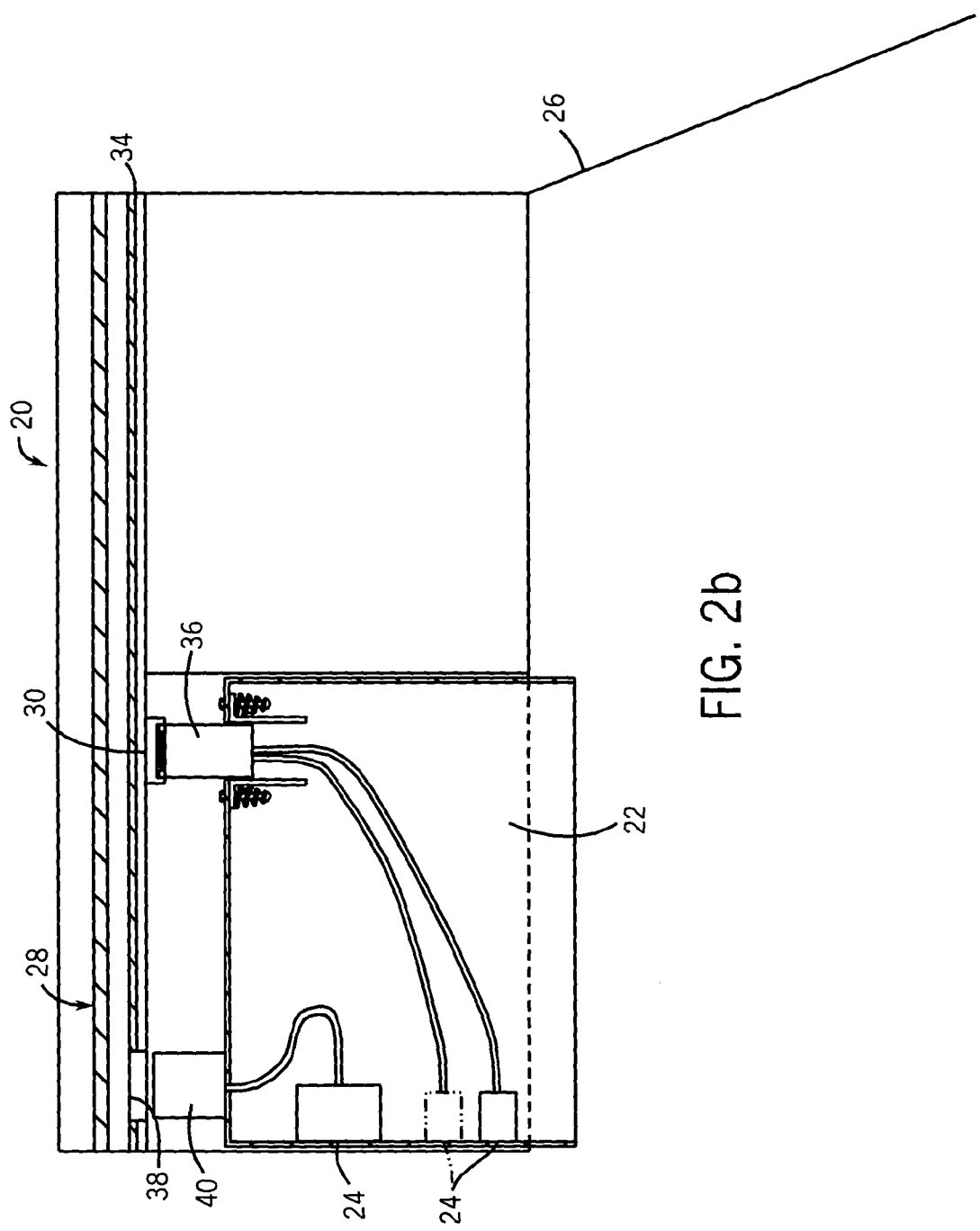
FIG. 2b is a plan view of the enclosure if FIG. 1 in which the top panel is removed and the component assembly is partially disengaged from the enclosure such that main power is disengaged but the component assembly still receives secondary power as well as data signals.

FIG. 1 illustrates an exemplary enclosure 20. It is to be noted that the present technique may be employed as a connection system in various types of electrical assemblies where power and data transmission are desired. However, for the purposes of explanation, the present technique will be described in relation to a power and data connection within an enclosure. The enclosure 20 has one or more doors 26 such that the doors can be closed to isolate the components housed within component assemblies 22 while in operation and opened to access the components when necessary. Inside the enclosure 20 may be a collection of removable component assemblies 22 having a set of components 24. These components 24 are generally interconnected as they send and receive various signals to one another and to external circuitry.

The exemplary enclosure 20 receives a first power level from a bus 28 (shown in FIG. 2). This bus 28 may carry main power, for example, 3 phase ac power, such as 208 to 690 Volts ac, to the enclosure 20. Various components 24, however, may operate at different power levels than the main power coming from the bus 28. Additionally, the components 24 may require communication of network data signals to and from various other components 24 disposed in other areas. To facilitate the transmission of secondary power and network data, an exemplary rail assembly 30 is employed. The rail assembly 30 may be supported on a horizontal support member 32. The support member 32, in turn, is affixed to a rear support 34 of the enclosure 20. In the illustrated embodiment, the support member 32 runs perpendicular to the rail 30. However, in alternative embodiments, the support member 32 and rail 30 may be oriented in various positions with respect to each other.

Within each component assembly 22 may be a connector assembly 36 configured to mate with the rail 30. Specifics of the connector assembly 36 will be discussed in subsequent paragraphs. As illustrated, the connector assembly 36 is fastened to the component assembly 22 and electrically coupled to the various components 24. The connector assembly 36 is positioned so as to allow the connector assembly 36 access to the rail 30 through an access side of the component assembly 22, such as a rear wall. Once coupled to the rail 30, various cable connections may be employed between the connector assembly 36 and the components 24 as to facilitate distribution of secondary power and network data.

FIGS. 2a and 2b illustrate the enclosure 20 of FIG. 1 in plan view with the top panel removed. Through the support 34 is an access port 38 aligned with a main power connector 40 that is attached to the back panel of the component assembly 22.

In FIG. 2a, the component assembly 22 is shown in the engaged position. When in the engaged position, the main power connector 40 is connected to the main power bus 28, while the connector assembly 36 is connected to the rail 30. In FIG. 2b, the main power connector 40 is subsequently disconnected from the main power bus 28 and the connector assembly 36 remains connected to the rail 30.

Figure 3A:
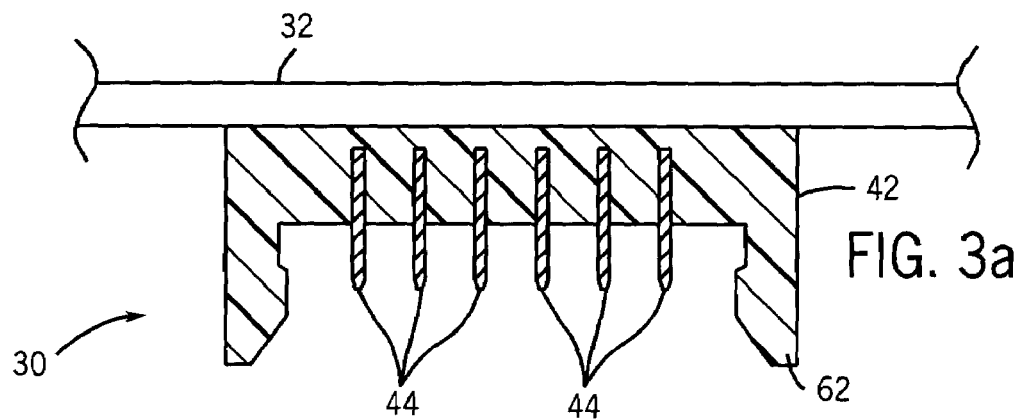
FIG. 3a is a cross-section view of an exemplary open rail system for power and data distribution disposed within the exemplary enclosure.
Figure 3B:
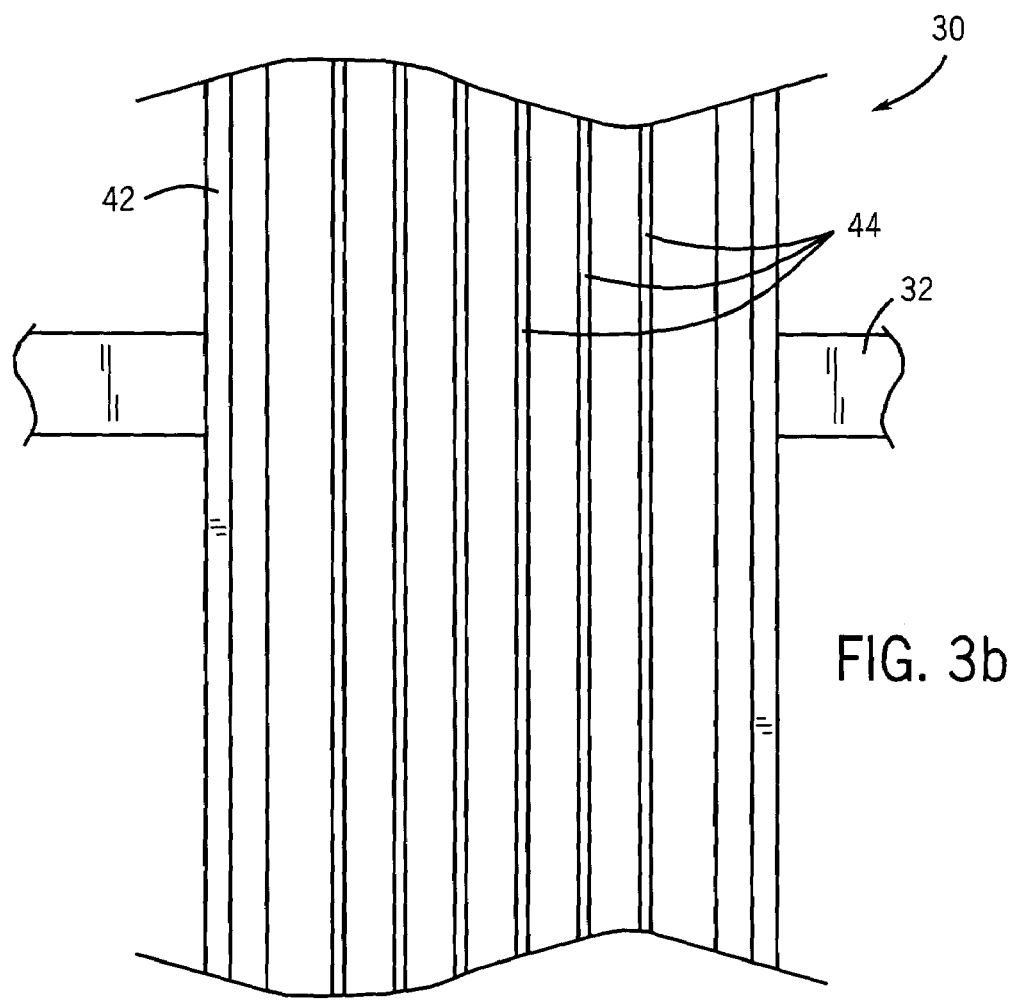
FIG. 3b is a front view of the exemplary open rail system disposed of within the exemplary enclosure.
Figure 4:
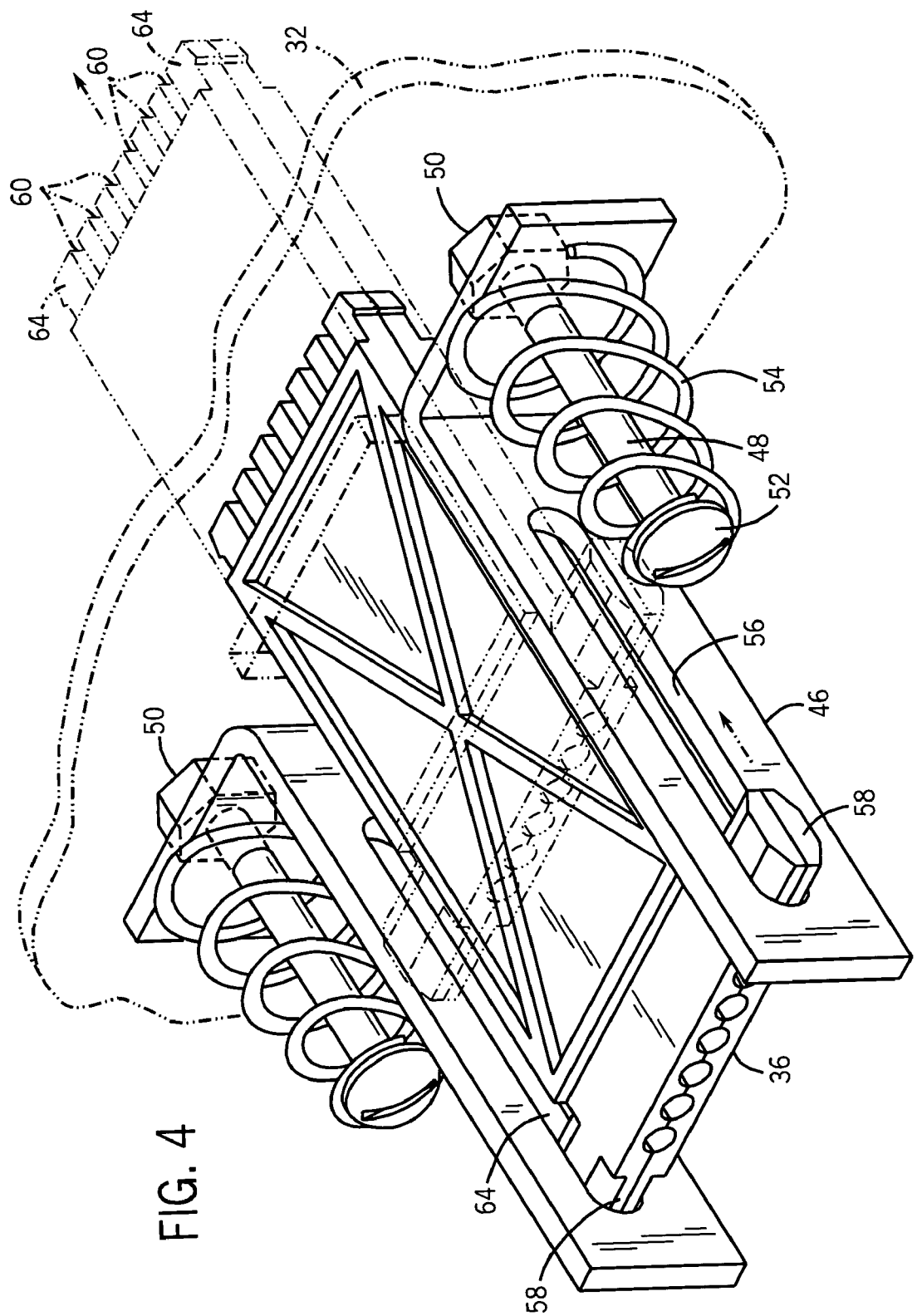
FIG. 4 is a perspective view of an exemplary connector assembly configured to engage the open rail system.

Turning next to FIGS. 3 and 4, these figures illustrate an exemplary technique for maintaining the connector assembly 36 in communication with the rail 30 while in an extracted position. Beginning with FIGS. 3a and 3b, the rail assembly 30 comprises of a rail housing 42 that supports a plurality of conductive rails 44. The rail housing 42 is fabricated from an electrically insulative material so as to prevent an electrical short between the conductive rails 44. The conductive rails 44 are embedded into the rail housing 42 and, as such, supported by the housing 42. The rails 44 are fabricated from a conductive material preferably a copper or copper alloy. The rails, as shown, are unshielded. However, insulative shielding may be employed as long as electrical access areas are also provided.

The connection between the component assembly 22 and the rails 44 is facilitated by the connector assembly 36 as best shown in FIG. 4. The connector assembly 36 is a multi-piece structure that is slidably mounted to the component assembly 22. A pair of L-shaped brackets 46 are mounted to the interior side of the back panel of the component assembly 22 via a set of mounting bolts 48. The mounting bolts 48 pass through the bracket 46 and the back panel of the component assembly 22 and, subsequently, are fastened by corresponding mounting nuts 50. Inserted between the heads 52 of the mounting bolts 50 and the brackets 46 are compression springs 54. The compression springs 54 allow for minor adjustments in the position of the connector assembly 36. Such positionability also aids the user in aligning the connector assembly 36 with the rails 44.

Within the brackets 46 are a set of slots 56. The slots 56 are correspondingly mated with a set of tabs 58 located on the connector assembly 36. The tabs 58 are sized so as to allow free movement of the tabs 58 in a direction parallel to the length of the slots 56. During installation of the component assembly 22, the component assembly 22 is pushed into abutment with a section stop (not shown) located in the rear of the enclosure 20. At this point, the section may be connected to the main power bus 28 through the main power connector 40 (see FIG. 2a). When the connector assembly 36 loosely abuts the open rail 30, the relatively free nature of the tabs 58 in the bracket slots 56 allows the connector assembly 36 to remain in a stationary location relative to the moving component assembly 22. Because the slot 56 has a fixed length, the free travel of the connector assembly 36 will terminate once this distance has been traversed. Subsequently, the slot 56 perimeter contacts with the tab 58 of the connector assembly 36 on each side and drives the assembly towards the open rail 30. As the connector assembly 36 travels toward the rails 44, a set of engagement grooves 60 mate with the rails 44 (see broken lines in FIG. 4). Minor misalignments between the engagement grooves 60 and rails 44 are corrected by the flexible nature of the compression springs 54. The connector assembly 36 is then secured to the rail housing 42 by a lock and key system. A set of flexible locks 62 (see FIG. 5), located on the rail housing 42, outwardly deform to accept a pair keys 64 (see FIG. 4) located on the outer edges of the connector assembly 36. The lock and key system prevents unintended disengagement of the connector assembly 36 from the rail housing 42. While engaged, the component assembly 22 receives both main power and secondary power as well as network data.

In this arrangement, the exemplary main power bus can be disengaged while the rail remains engaged. This is accomplished by extracting the component assembly 22 from the enclosure 20 in a direction away from the open rail 30. As the component assembly 22 is extracted, the main power connecter 40 disengages from the main power bus 28. In contrast, the slideable nature of the connector assembly 36 allows the connector assembly 36 to remain engaged to the rail housing 42. In this service position, the component assembly 22 is disengaged from main power yet still receives secondary power and network data. Certain of the components 24 remain active and, as such, can continue operating while service is being performed. Continuity of operation reduces down-time and improves the efficiency of the operation. Moreover, problems occurring in the field may be difficult to replicate and diagnose in a separate laboratory environment. That is, the units and components are more reliably tested in their application environment, while main power is disconnected.

As the component assembly 22 is further extracted from the enclosure 20, the range of motion of the tab 58 and connector assembly 36 is limited by the perimeter of the slot 56. At this point, the bracket slots 56 pull the connector assembly 36 away from the open rail 30. The force of the bracket 46 on the connector assembly 36 is sufficient to elastically deform the locks 62 and release the keys 64 from the rail housing 42. Once released, the engagement grooves 60 are pulled out of contact from the rails 44. At this point, the secondary power and network data signals are no longer received by the component assembly 22 or its components. In the illustrated embodiment, the connector assembly is designed to engage and disengage with each of the open rails simultaneously. However, in an alternate embodiment, the dimensions of the engagement grooves 60 and corresponding rails 44 may be altered so as to allow staggered engagement and disengagement of the component assembly 22 from specific rails 44, such as for first mating and last breaking of a ground connection. Even upon full disengagement of the component assembly 22, the rail system can still feed the remaining component assemblies 22 of the enclosure 20. Accordingly, the enclosure can remain online and functioning.

Figure 5:
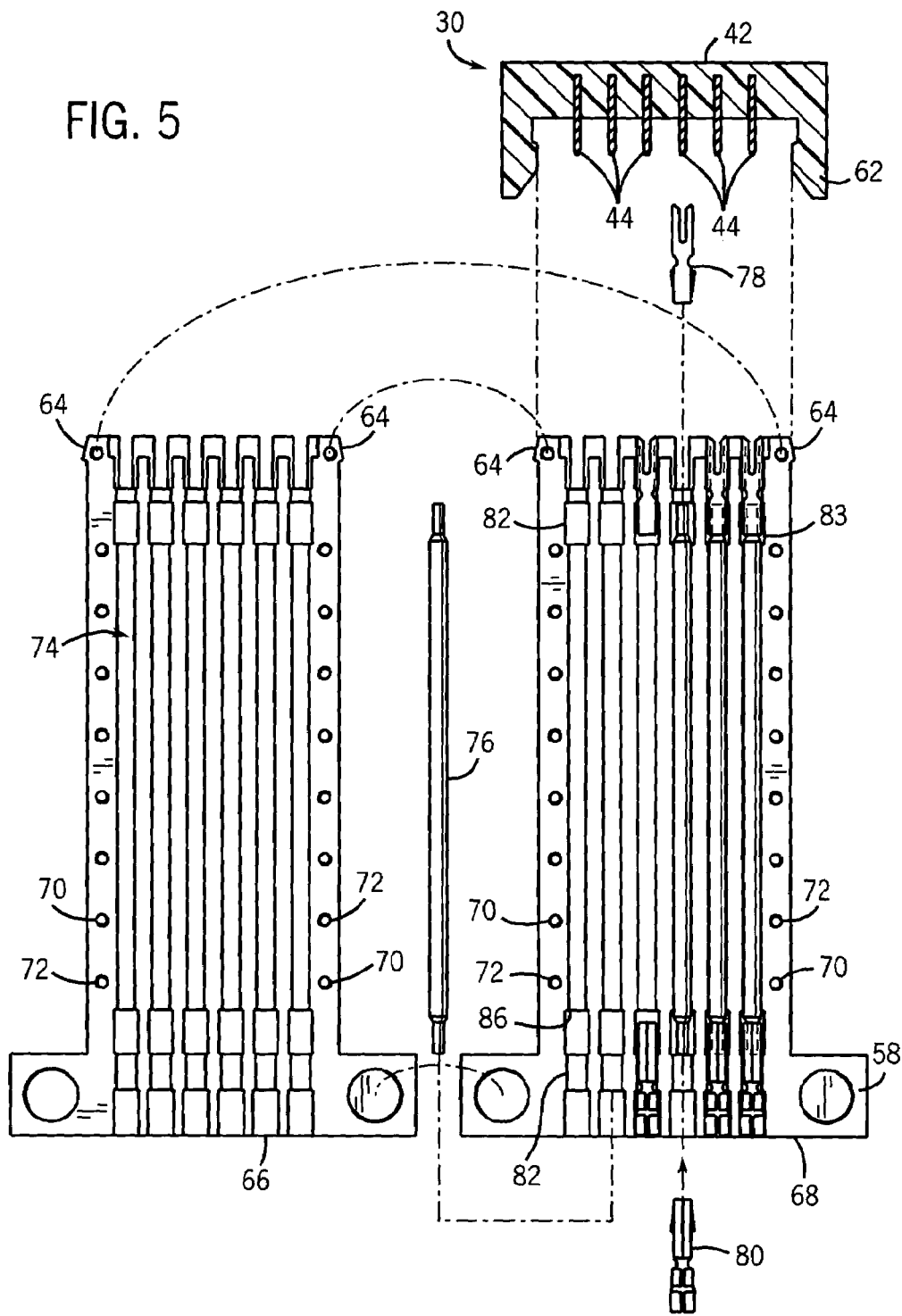
FIG. 5 is an exploded view of the exemplary connector assembly prior to engagement with the open rail system of FIGS. 3a and 3b.

FIG. 5 shows an exploded view of an exemplary connector assembly 36. The connector assembly 36 is fabricated from an insulative material, typically plastic. The connector assembly 36 comprises an upper piece 66 designed to lockingly mate with a lower piece 68. The connector assembly is fashioned together by corresponding pins 70 and holes 72 located along the outer edges of the respective pieces 66 and 68. Close tolerances between the holes 72 and pins 70 creates a friction fit between the two pieces. Disposed within both the upper and lower pieces 66 and 68 are a series of channels 74. At the ends of each channel are barbell shaped cavities 82. Each channel 74 is designed to secure various conductors necessary to maintain electrical contact between the two ends of the connector assembly 36. The channels 74 are configured to secure conductive rods 76, while the cavities 82 are designed to hold various sockets 78 and 80. The conductive rod 76 is tapered so as to provide a male connection that may be inserted into female ends of rail socket 78 and cable socket 80, respectively. Again the diameter of the taper and the socket opening are maintained in close tolerance as to create a friction fit between the two members.

Referring also to FIGS. 6a and 6b, these figures illustrate perspective views of the cable socket 80 and the rail socket 78, respectively. On each socket 78 and 80 are a set of elastic tabs 84 that are biased in the outward direction. When inserted into the cavities 82, the free ends of the tabs 84 abut against the central and reduced diameter portion of the barbell shaped cavities 82. This abutment prevents the socket 78 or 80 from moving in an outward manner respective to the connector assembly 36. Moreover, the inner portion of the barbell shaped aperture 82 creates a shoulder 86 that also helps maintain the sockets 80 and 78 in a fixed position.

The electrical connection between the rail 44 and the connector assembly 36 occurs when the rail socket 78 comes into contact with its respective rail 44. As the connector assembly is driven towards the rails 44, a guide notch 88 directs the rail 44 into a forked groove 90 on the rail socket 78. By varying the length of the rail 44 or of the socket 78 or a combination thereof, engagement of each socket 78 with its respective rail can occur at staggered positions. Thus, a multiple number of conductive positions can be maintained. For example, a subset position could be a position such that the ac power is disconnected, again for example, while the dc, or more generally control power, and network data signals remain engaged.

Figure 7B:
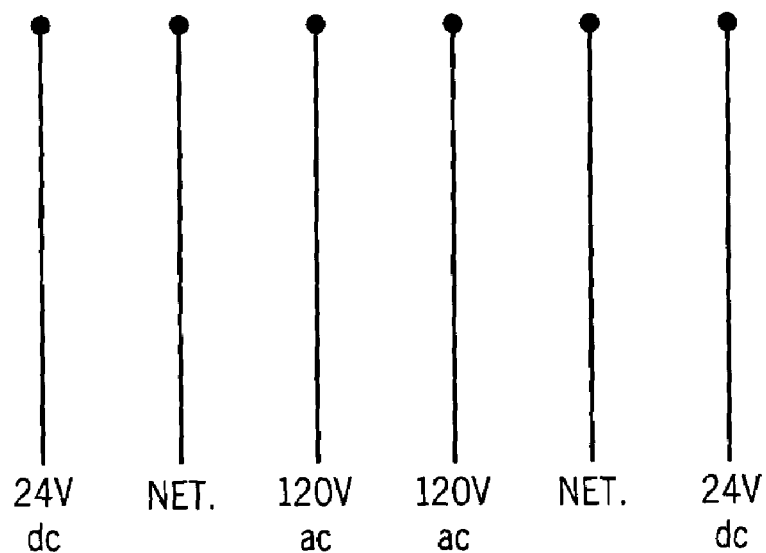
FIG. 7b is an electrical schematic of another exemplary configuration of signals conducted over the rail system.
Figure 7C:
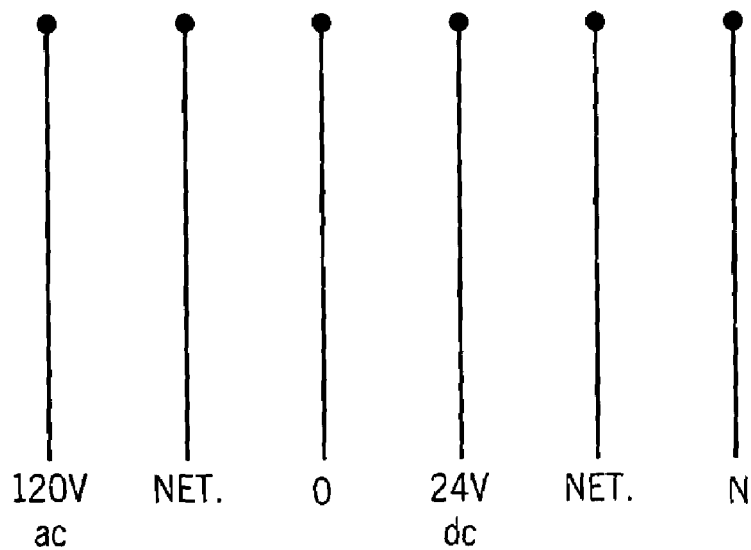
FIG. 7c is an electrical schematic of yet another exemplary configuration of signals conducted over the rail system.

FIGS. 7a, 7b, and 7c depict exemplary power and data signals configurations that may be conducted over the rails 44. Although a six rail configuration is shown in the exemplary figures, it is to be noted that any number of configurations of data and power signal rails can employ the present technique. For example, a four conductor rail capable of carrying a single power level and a data set may also employ the present technique. The first figure, FIG. 7a, shows the outermost rails 44 carrying the 120V ac power, the intermediate rails 44 carrying the 24V dc power and the innermost rails 44 carrying the network data signals. Engagement and disengagement of the connector assembly 36 from the power rails, or variations in power over the rails, can induce electrical perturbations in the data rails. In order to reduce the impact of such changes in the electrical system, capacitors 92 may be coupled across the power lines as to at least partially attenuate such changes. The capacitors 92 may be placed over both sets of power conductors or only over a single set if so desired.

FIG. 7b illustrates another electrical configuration for the rails 44. In this configuration, the exemplary dc power is conducted over the outermost rails, the data signals over the innermost rails, and the ac power over the intermediate rails. By running the power conductors along rails juxtaposed to the data conductor rails, the power rails may at least partially shield the data rails from stray electromagnetic interference and crosstalk. FIG. 7c illustrates yet another electrical configuration for the rails 44 in which ac power is applied to the outermost rails, dc power is applied to the innermost rails, and data signals are applied to the intermediate rails.

It should be noted that the electrical properties of the rail and system can be altered by varying the distances between the rails 44. By varying the space between the data conductors or by varying the space between the first and second power conductors with respect to the data conductors, properties such as capacitance, inductance, velocity of propagation, crosstalk, shielding or characteristic impedance may be affected.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A rail system for transmitting power and data signals comprising:
   an insulative support;
   first and second power conductors supported lengthwise on the support via an elongate support edge at least partially embedded in the insulative support, and configured to conduct electrical power; and
   first and second data conductors supported lengthwise on the support via an elongate support edge at least partially embedded in the insulative support, wherein the data conductors are disposed between the power conductors and configured to transmit data signals;
   wherein each of the power and data conductors presents a respective elongate connection edge opposite the respective support edge, the connection edges being generally aligned for receiving respective connector elements.

2. The system of claim 1, wherein the power conductors at least partially shield the data conductors from electromagnetic interference.

3. The system of claim 1, further comprising at least one capacitor coupled across the power conductors.

4. The system of claim 1, further comprising a second set of power conductors supported lengthwise on the support at cross sectional outermost positions on either side of the first and second power conductors.

5. The system of claim 1, wherein the conductors are uninsulated conductive rails.

6. The system of claim 1, wherein the first and second data conductors are spaced from one another by a first, substantially constant predetermined distance.

7. The system of claim 6, wherein the first and second power conductors are spaced from respective data conductors by a second, substantially constant predetermined distance.

8. The system of claim 7, wherein the first predetermined distance is equal to the second predetermined distance.

9. A rail system for transmitting power and data signals comprising:
  an insulative support;
  a first set of power conductors supported lengthwise on the support and configured to conduct electrical power;
  a second set of power conductors supported lengthwise on the support and configured to conduct electrical power; and
  first and second data conductors supported lengthwise on the support and configured to transmit data signals;
  wherein the first and second set of power conductors and the first and second data conductors do not flex mechanically during engagement or disengagement with a mating connector assembly.

10. The system of claim 9, wherein if the first set of power conductors are identified as A and B, the second set of power conductors are identified as C and D, and the data conductors are identified as E and F, the conductors are disposed cross-sectionally on the support in the order A, C, E, F, D, B.

11. The system of claim 10, wherein conductors A and B are configured to transmit ac power.

12. The system of claim 11, wherein conductors C and D are configured to transmit dc power.

13. The system of claim 9, wherein if the first set of power conductors are identified as A and B, the second set of power conductors are identified as C and D, and the data conductors are identified as E and F, the conductors are disposed cross sectionally on the support in the order A, E, C, D, F, B.

14. The system of claim 13, wherein conductors A and B are configured to transmit ac power.

15. The system of claim 13, wherein conductors C and D are configured to transmit dc power.

16. The system of claim 9, further comprising a first capacitor coupled across the first set of power conductors.

17. The system of claim 16, further comprising a second capacitor coupled across the second set of power conductors.

18. The system of claim 9, wherein the conductors are disposed at substantially equal spacing across the support.

19. An open rail system for transmitting power and data signals comprising:
  an insulative support;
  first and second data conductors supported lengthwise on the support and configured to transmit data signals;
  a first set of power conductors supported lengthwise on the support at positions flanking the data conductors and configured to conduct electrical power;
  a second set of power conductors supported lengthwise on the support at positions flanking respective power conductors of the first set and configured to conduct electrical power; and
  a capacitor coupled across the first set of power conductors.

20. The system of claim 19, further comprising a second capacitor coupled across the second set of power conductors.

21. The system of claim 19, wherein the first set of power conductors transmits dc power.

22. The system of claim 21, wherein the second set of power conductors transmits ac power.

23. The system of claim 19, wherein the first set of power conductors transmits ac power.

24. The system of claim 23, wherein the second set of power conductors transmits dc power.

25. A rail system, comprising:
  an insulative support;
  first and second rail power conductors mounted to the insulative support;
  first and second rail data conductors mounted to the insulative support, wherein the data conductors and the power conductors are substantially parallel to one another;
  wherein each the rail data conductors and the rail power conductors is mechanically engageable with a plurality of connectors at a plurality of locations along the length of the rail, each connector being connected to a different electrical component.

26. The rail system as recited in claim 25, comprising at least one capacitor coupled across the power conductors.

27. The rail system as recited in claim 25, wherein the first and second data conductors are disposed between the first and second power conductors.

28. The rail system as recited in claim 25, wherein the rail power conductors and the rail data conductors extend over at least three-fourths of the length of the insulative support.

* * * * *